United States Patent [19]
O'Connor

[11] Patent Number: 5,848,288
[45] Date of Patent: Dec. 8, 1998

[54] METHOD AND APPARATUS FOR ACCOMMODATING DIFFERENT ISSUE WIDTH IMPLEMENTATIONS OF VLIW ARCHITECTURES

[75] Inventor: Dennis M. O'Connor, Chandler, Ariz.

[73] Assignee: Intel Corporation, Santa Clara, Calif.

[21] Appl. No.: 530,076

[22] Filed: Sep. 20, 1995

[51] Int. Cl.[6] ............................................ G06F 9/30
[52] U.S. Cl. .................. 395/800.24; 395/379; 395/386
[58] Field of Search ................................. 395/379, 382, 395/386, 391, 800.24

[56] References Cited

U.S. PATENT DOCUMENTS

| | | | |
|---|---|---|---|
| 3,771,141 | 11/1973 | Culler | 395/379 |
| 5,163,139 | 11/1992 | Haigh et al. | 395/382 |
| 5,197,135 | 3/1993 | Eickemeyer et al. | 395/391 |
| 5,303,356 | 4/1994 | Vassiliadis et al. | 395/800.24 |
| 5,390,355 | 2/1995 | Horst | 395/382 |
| 5,442,762 | 8/1995 | Kato et al. | 395/382 |
| 5,459,844 | 10/1995 | Eickemeyer et al. | 395/391 |
| 5,509,130 | 4/1996 | Trauben et al. | 395/382 |
| 5,560,028 | 9/1996 | Sachs et al. | 395/800.24 |
| 5,673,409 | 9/1997 | Hicok et al. | 395/391 |

OTHER PUBLICATIONS

De Gloria et al., *A Programmable Instruction Format Extension to VLIW Architectures,* IEEE 1992, pp. 35–40.

*Primary Examiner*—Richard L. Ellis
*Attorney, Agent, or Firm*—Blakely, Sokoloff, Taylor & Zafman LLP

[57] ABSTRACT

A method and apparatus which permits a computer system to execute variable size instruction bundles. A processor fetches an instruction issue group of the size it can issue in one cycle. By detecting if an end of bundle exists in an instruction issue group and disabling the issue of instruction following an end of bundle, the computer is enabled to execute code compiled for arbitrary bundle size.

16 Claims, 4 Drawing Sheets

METHOD AND APPARATUS FOR ACCOMMODATING DIFFERENT ISSUE WIDTH IMPLEMENTATIONS OF VLIW ARCHITECTURES

BACKGROUND OF THE INVENTION (1) Field of the Invention

The invention relates to computer systems able to issue multiple instructions in a single clock cycle. More specifically, the invention relates to providing compatibility between systems issuing different size bundles of instructions per cycle.

(2) Related Art

Two techniques have developed in the high-end computer market to improve code execution speed: 1) very long instruction word (VLIW) machines and 2) superscaler machines.

VLIW machines are premised on the fact that a fixed length bundle of instructions will be issued every clock cycle. For example, one VLIW machine may allow two instructions per cycle, another four per cycle, and another eight per cycle. Because the size of the bundle is fixed in any VLIW machine, a machine issuing eight instructions per cycle cannot execute code compiled for four instructions per cycle. Moreover, because all bundles must be the same size, code density suffers where the bundle size is achieved by adding no ops to the bundles. For example, in a four instruction VLIW machine where three consecutive instructions each depend on the one before it, the bundles would be first instruction and three no ops, second instruction and three no ops, and third instruction and three no ops. This low code density increases the probability of thrashing the cache, as well as reducing the probability of a cache hit on any instruction.

Superscaler machines suffer from a different problem. Specifically, superscaler machines are designed to take incoming scaler programs and detect all the dependencies between the various instructions to determine at run time if the particular instructions can be executed concurrently. The hardware required to do this where more than two instructions are to issue in a single cycle becomes quite complex and quickly results in the critical time path resulting in slower clock cycles and therefore a slower operation.

As mentioned above, both these avenues of performance improvement are directed towards the high-end market, and they tend to be quite expensive. Moreover, as discussed above, the code created for a high-end VLIW machine, say eight instructions per cycle, will not run on a VLIW machine which only issues four instructions per cycle, and vice versa. Additionally, while the bundling for VLIW will not preclude superscaler operation, it fails to address the critical time path created in the dependency checking of a superscaler machine able to issue more than two instructions in any cycle. Thus, software vendors are required to maintain and support architecture specific code. This feature increases the cost of various software programs and reduces availability of high-end software in the lower end market.

In view of the foregoing, it would be desirable to develop a system which maintains compatibility independent of bundle size. This would allow high-end software of eight instructions per cycle to be used on lower end machines of one, two, three, four, etc. instructions per cycle or, alternatively, on a higher end machine accommodating, e.g. sixteen instructions per cycle. Moreover, it would be desirable to eliminate the need to do run time dependency checking of simultaneously issued instructions as is required in superscaler machines.

BRIEF SUMMARY OF THE INVENTION

A method and apparatus which permits a computer system to execute variable size instruction bundles is disclosed. A processor fetches the number of instructions it can issue in a cycle from an instruction store. The fetched instructions are partially decoded to determine if an end of bundle exists among the fetched instructions. When an end of bundle is located, any fetched instruction after the end of bundle is prevented from issuing in the cycle. The instructions up to and including the end of bundle are issued in this cycle. It is also necessary to fully decode the instructions before issue using a standard decoding circuit. This can be performed either at the same time or after the partial decode. If the end of bundle is determined before standard decode, the instructions to be prevented from issuing can be disabled either before or after the decode circuit.

In one embodiment, an architectural update occurs responsive to location of an end of bundle. The update occurs in the writeback phase of the cycle. A device for maintaining the architectural state of the system is necessary in any system where source locations used within a bundle can be modified by the bundle. The described method and apparatus allows a single compilation of code to be maintained and used in machines along the price performance spectrum.

DETAILED DESCRIPTION OF THE INVENTION

A method and apparatus for accommodating varying size instruction bundles is described. In the following description, numerous specific details are set forth in order to provide a thorough understanding of the present invention. It will be apparent, however, to one skilled in the art that the present invention may be practiced without these specific details. In other instances, well known methods and circuits are not described in detail in order to not obscure the present invention.

Figure 1A:
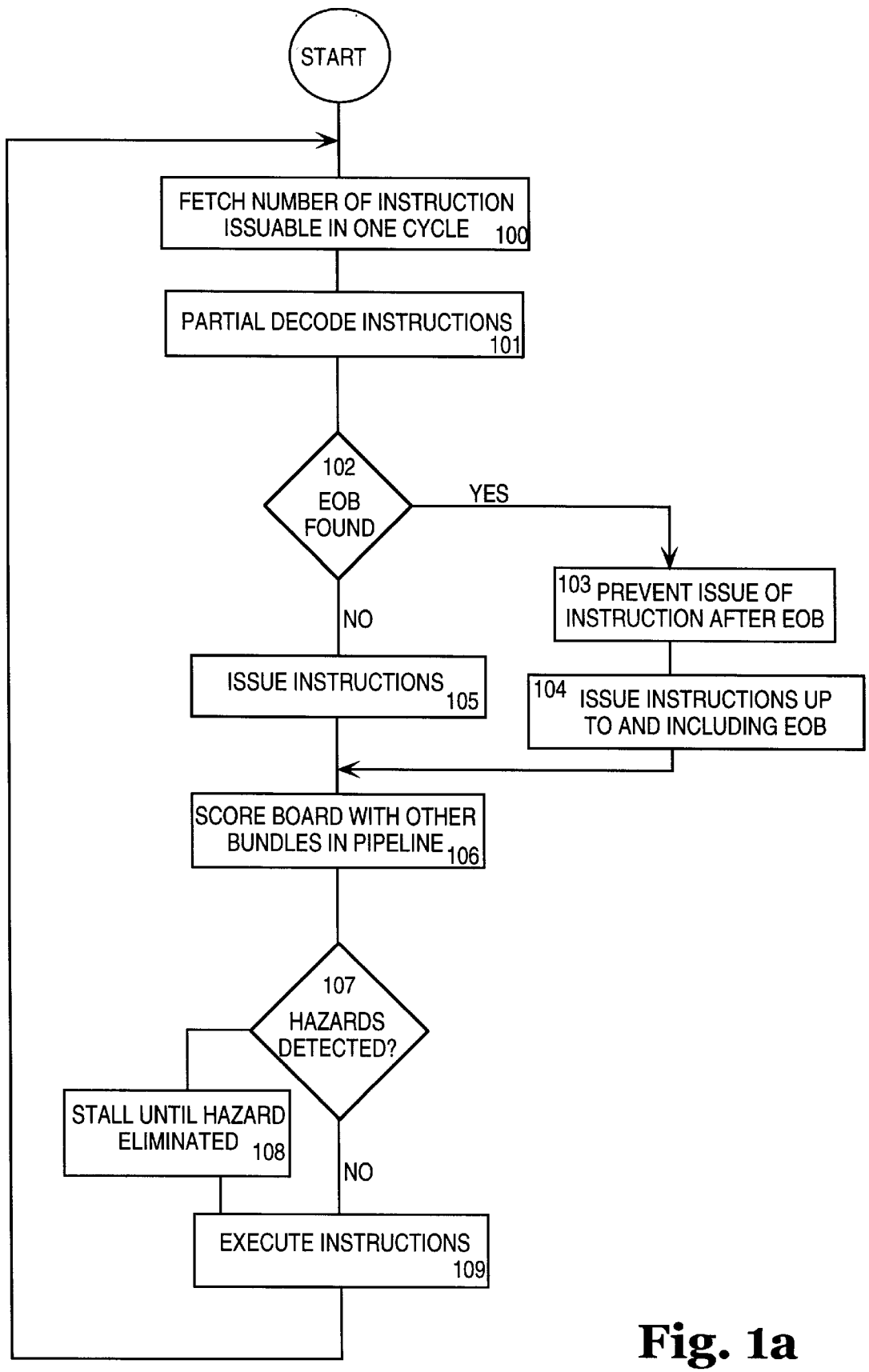
FIG. 1A is a flowchart reflecting flow in a pipeline of a system employing an embodiment of the instant invention.

FIG. 1A is a flow chart which reflects the operation of a system employing the present invention. Beginning with functional block 100, the system fetches however many instructions the system can issue in one cycle. The fetch is performed without regard to bundle size at compile time. Moreover, since the fixed bundle size need not be maintained, a compiler compiling code for use with the present invention need not add no ops to fill instruction bundles.

In block 101, a partial decode of the fetched instructions is performed. The purpose of the partial decode is to identify if an end of bundle exists within any of the fetched instructions. The end of bundle can be determined in either of two ways: (1) explicitly, whereby a predetermined bit is set for each instruction which is an end of bundle, or (2) implicitly, whereby all instructions of a certain type are at the end of a bundle, e.g. every end of a bundle is a branch instruction. It is also possible to use a hybrid of these techniques such that an end of bundle is indicated either by checking for a bit set or by, e.g. a branch instruction. Both methods have advantages and disadvantages. The bit check method requires an additional bit be provided in the instruction line and, accordingly, associated additional hardware required to accommodate the wider instruction (unless the architecture has unused bits in the instruction line). Alternatively, the bit check method requires that an unused bit 75 be present within the instruction word, such bit can then be used without paying the additional hardware cost penalty. The branch check method may require the addition of spurious branches by the compiler, but would not require a wider instruction to implement.

In functional block 102, a check is made to determine if an end of bundle is identified in any fetched instruction group. If the answer is the affirmative, block 103 prevents the fetched instructions following the end of bundle within the group from issuing. Preventing the issue of the instruction following an end of bundle can be done by converting those instructions to no ops or, for example, disabling the clock along the perspective issue paths of the instructions whose issue is to be prevented. The instructions up to and including the end of bundle can then be issued as indicated in block 104 and 105. The issued bundle is then scoreboarded with other bundles remaining in the pipeline. If a hazard is detected 107, the particular bundle is stalled until the hazards are eliminated 108. If no hazards are detected, or once they are eliminated, the issued bundle of instructions is executed 109. A standard decode must be performed before the instructions can be issued. This decode can be done either at the time of the partial decode or after the instructions to be issued are determined. Either case is equally acceptable. Issue, scoreboarding and standard decode and execution are performed in the usual way. See, generally, Henessey & Patterson, "Computer Architecture, a Quantitative Approach."

Figure 1B:
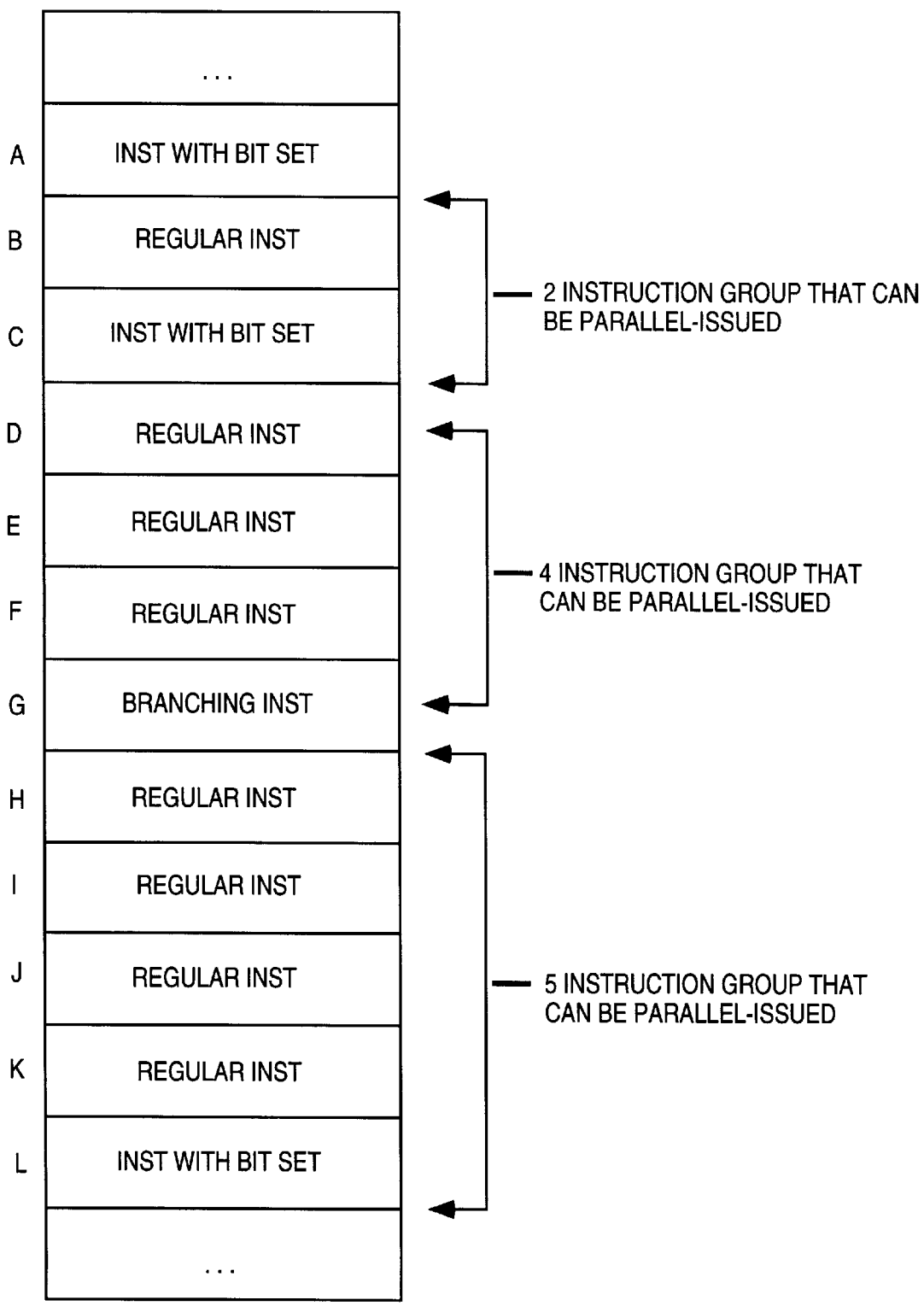
FIG. 1B shows a sample code compilation for use with the invention.

FIG. 1B illustrates a possible compile of an instruction stream for use in connection with the instant invention. In a machine having an issue width of two instructions in cycle 1, A and B would be fetched. A would be identified as an end of bundle and would proceed through to issue, while B would be prevented from issuing. In a second cycle, B and C would be fetched and issued. In a third cycle, D and E would be fetched and issued, followed by F and G, H and I, J and K, and L. In a machine having a possible instruction issue width of five instructions, on a first cycle, A–E would be fetched. A would be identified as an end of bundle, and B through E would be prevented from issuing. In the following cycle, B through F would be fetched. C would be identified as an end of bundle, and D, E, and F would be prevented from issuing. The following cycle D–H would be fetched, G would be identified as an end of bundle, and H would be prevented from issuing. On a subsequent cycle, H–L would be fetched and issued. In the case that more than five instructions could be issued in parallel given the sample code set, all fetched instructions beyond the first end of bundle fetched would be prevented from issuing.

Figure 2:
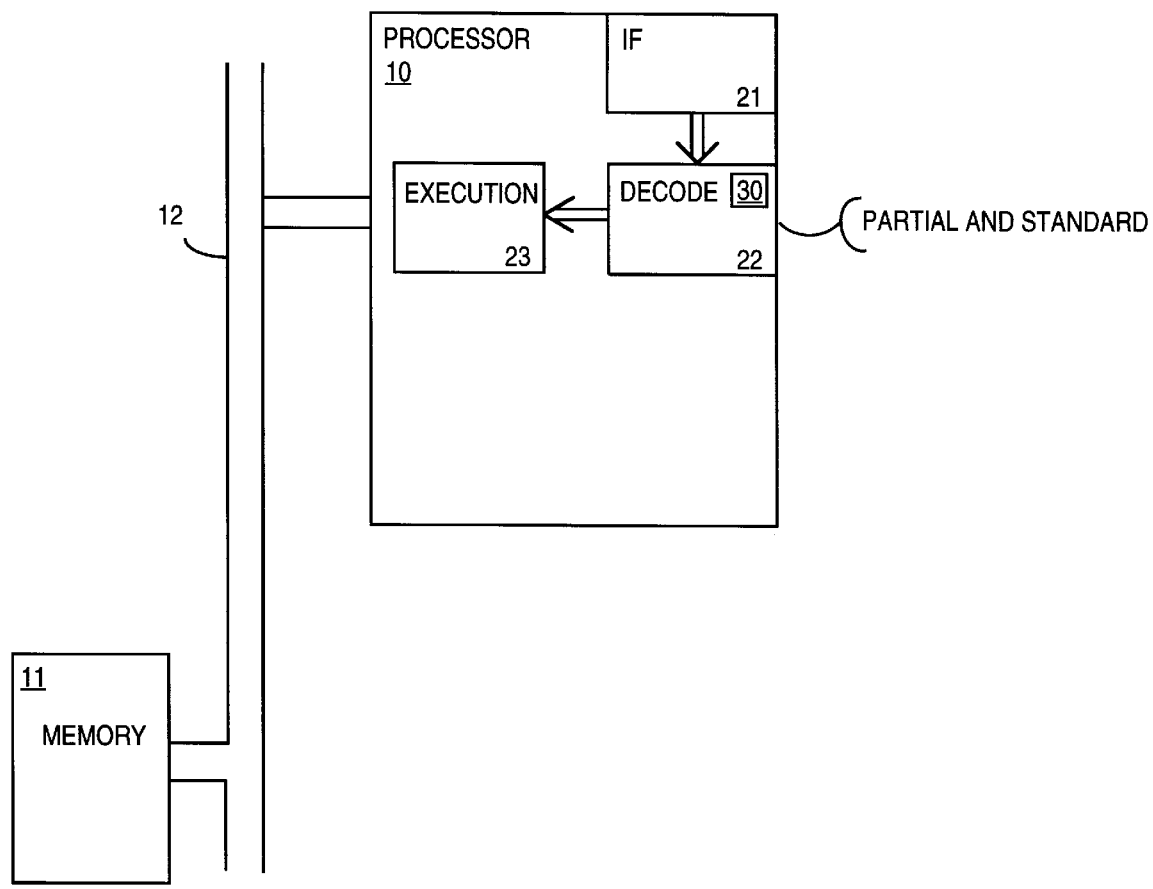
FIG. 2 is a block diagram of a system employing an embodiment of the invention.

FIG. 2 shows a processor 10 incorporating a decode circuit 22 of the instant invention coupled to a memory 11 by a bus 12. In the shown embodiment, the decode circuit 22 resides between an instruction fetch mechanism 21 and an execution mechanism 23. This allows the partial decode to be done either before or simultaneously with the standard decode and does not add additional stages to the pipeline.

Figure 3:
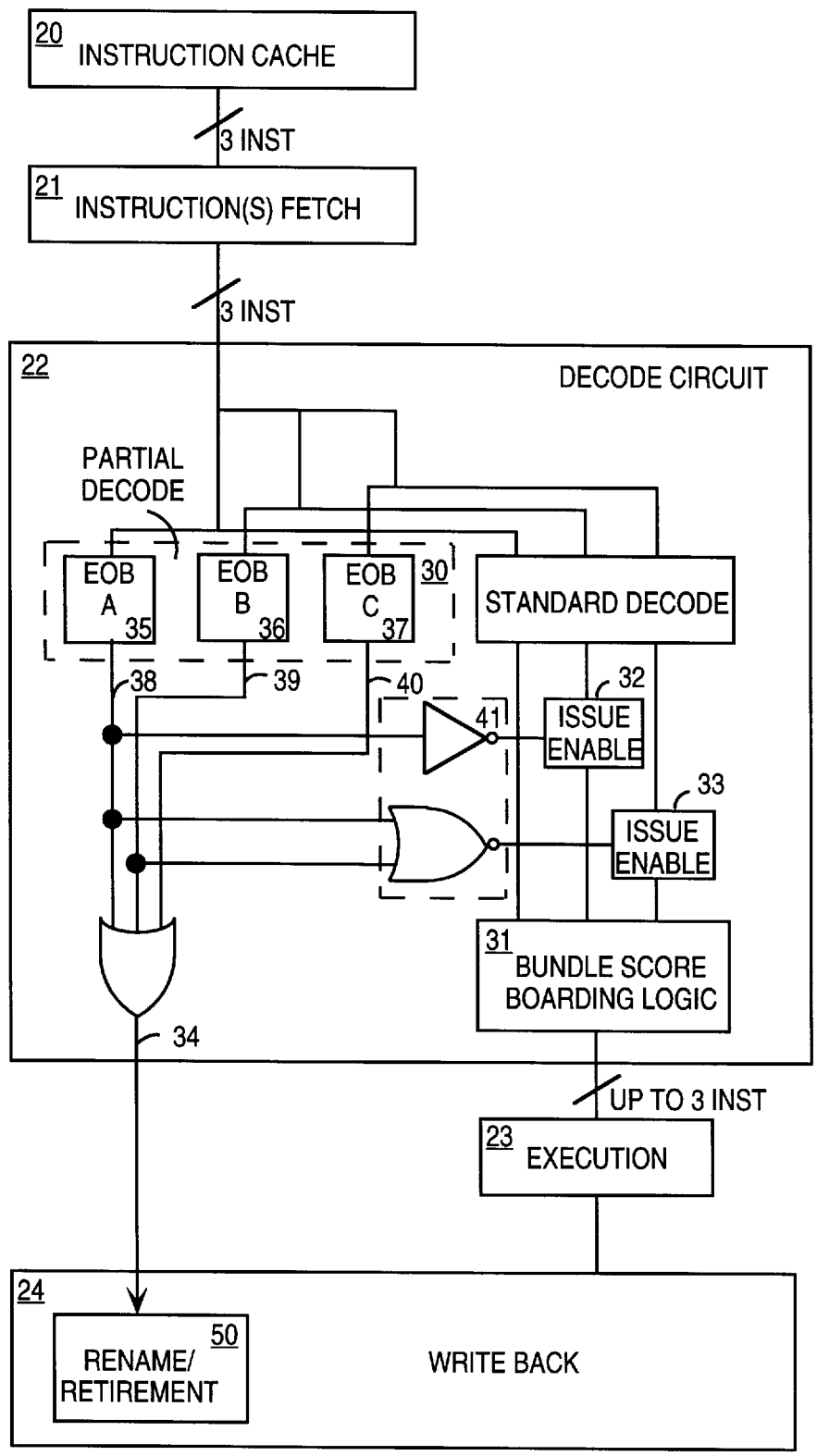
FIG. 3 is a block diagram of a pipeline employing one embodiment of the invention.

FIG. 3 is a block diagram reflecting pipeline circuitry of a system capable of issuing three instructions employing the instant invention. Three instruction issue width was selected purely for illustrative purposes. Accordingly, it is within the scope and contemplation of the instant invention to cover any possible issue width. The instruction fetcher 21 fetches three instructions per cycle from instruction cache 20. Both the instruction fetch and the instruction cache are implemented in the standard way. The fetched instructions are provided to decode circuit 22. Partial decode 30 determines if each instruction fetched is an end of bundle. End of bundle detectors 35–37 indicate whether a particular instruction has been found to be an end of bundle. These signals drive logic which enables or disables the issue of any instructions following an end of bundle. Additionally, if an end of bundle is found in any fetched instruction, a rename or retirement algorithm should be invoked if necessary. Any instructions not disabled passes to the bundle scoreboarding logic 31 to evaluate hazards between the current issue group and other bundles in the pipeline. Once no hazards exist, the instruction group is passed on to the execution unit 23 and then to the write back unit 24. Execution unit and write back unit employ generally well known techniques except insofar as the triggering of the architectural updates which are described more fully below.

If an end of bundle detector 35–37 detects an end of bundle, it asserts a signal 38–40. If such signal is asserted, logic 41 prevents the issue of any instructions following the end of bundle. Moreover, an end of bundle in any issue group results in a signal 34 to update the architectural state of the machine. For example, if detector 35 detects an end of bundle, logic 41 will signal enablers 32 and 33 to prevent the issue of corresponding instructions, and signal 34 will signal the rename/retirement unit 50 to update the architectural state of the processor. Conversely, if no end of bundle is detected by any detector 35–37, all three instructions would be enabled to issue and signal 34 would not signal an architectural update. In another example, an end of bundle detected at detector 37 would result in an issue of all instructions and an architectural update. One of ordinary skill in the art will recognize that the above-described operation can be readily expanded to accommodate any size issue group, and such is considered within the scope of this invention.

In architectures which allow one instruction in a bundle to modify a register while guaranteeing that other instructions in the bundle will receive the old value of the register, a retirement or register renaming scheme should be employed. This is necessary because any time an issue group is smaller than a bundle, all instructions in the bundle will not be simultaneously reading their arguments. Thus, in a five instruction bundle on a three instruction machine, if the first three issued instructions change the value in register X from which either the fourth or fifth instruction must receive its argument, an error will result unless steps are taken to maintain the original value of X. The system employing the instant invention may either rename registers, i.e. the register having the result calculated for register X is named register X' until an end of bundle is reached, and then X' is renamed X. Alternately, the results can be held in the retirement buffer. Both schemes are generally known in the art, but significantly here the architectural update is effected in response to an end of bundle detected in an issue group. In the event that a system architect does not wish to employ either register renaming scheme or a retirement buffer, the system should not allow the overwrite of any register from which an argument is obtained within a bundle. This scheme requires a larger register stack since reuse of a register must not occur within a bundle.

Bundles of instructions for use with the instant invention are established by the compiler at compile time. A compiler can be made to either maximize bundle size or maximize bundle size up to a specific length, e.g. eight instructions. If the compiler maximizes bundle size, the complexity of the rename or retirement scheme will necessarily increase. If the system does not allow a register from which any instruction in a bundle receive arguments to be modified by the bundle, the required size of the register stack would increase because it must accommodate an arbitrary bundle size of unknown length. In any case, because the bundles are not fixed size and can be one, two, etc. up to the maximum number of instructions allowed, significantly higher code density can be achieved over typical VLIW machines in which the fixed bundle length requires addition of no ops to fill any bundle not being the required size. This increased code density translates into improved performance in the context of reduced cache thrashing. Moreover, because bundle size is not machine specific, only a single version of the software need be maintained and supported for machines at various points along the price performance spectrum. By shifting the time cost and complexity out of the silicon to the compiler, a one-time cost is paid as opposed to a cost for each unit. Additionally, while run time checking for end of bundle represents a non-trivial time cost, it does not approach the critical time path involved in more than two-way superscaler execution.

In the foregoing specification, the invention has been described with reference to specific embodiments thereof. It will however be evident that various modifications and changes can be made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

What is claimed is:

1. A computer system comprising:

a bus;

a processor having an issue width, the processor coupled to the bus and including, an instruction fetch unit that fetches an issue group of instructions from a memory, and an end of bundle detector that detects if an end of bundle exists within the issue group; and the memory coupled to the bus and having stored therein a plurality of bundles of instructions all instructions in a bundle capable of parallel issue, the bundles of instructions being a size up to a maximum size, the maximum size independent of the issue width of the processor.

2. The system of claim 1 further comprising:

an enabling device coupled to an issue line for enabling the issue line if no end of bundle exists in a preceding instruction of the issue group.

3. The system of claim 2 wherein the end of bundle detector is a partial decoder.

4. The system of claim 2 wherein the enabling device changes any instruction within the issue group following an end of bundle to a no op.

5. The system of claim 2 wherein the enabling device enables by providing a clock signal to the issue line.

6. The system of claim 2 wherein enabling device is coupled between the instruction fetching device and a full instruction decoder.

7. The system of claim 1 further comprising:

a disabling device coupled to an issue line which disables the issue line if the issue line is after an issue line having an end of bundle in the issue group.

8. The system of claim 1 wherein the bus is an internal bus and the memory is a cache memory.

9. The system of claim 1 wherein an end of bundle is indicated by a set bit in an instruction corresponding to the end of bundle, the bit being stored in the memory.

10. The system of claim 1 wherein a size of bundle is not equal to a size of the issue group.

11. The system of claim 1 wherein an end of bundle is indicated by a branch instruction stored in the memory.

12. The system of claim 1 wherein an end of bundle is indicated by one of a branch instruction stored in the memory and an instruction containing a bit set to a predetermined value stored in the memory.

13. The system of claim 1 wherein each bundle of the plurality of bundles stored in the memory is not a uniform size.

14. The system of claim 1 wherein no instruction in a bundle is permitted to modify a register accessed by a later occurring instruction in the bundle.

15. The system of claim 1 wherein the maximum bundle size is greater than the issue width of the processor.

16. A computer system comprising:

a bus;

a processor having an issue width, the processor coupled to the bus and including, an instruction fetch unit that fetches an issue group of instructions from a memory, and an end of bundle detector that detects if an end of bundle exists within the issue group;

the memory coupled to the bus and having stored therein a plurality of bundles of instructions, the bundles of instructions being a size up to a maximum size, the maximum size independent of the issue width of the processor; and a retirement unit within the processor to insure a later issued instruction can read a valid data from a register modified by an earlier issued instruction of a same bundle, the retirement unit updating the register responsive to a detected end of bundle.

* * * * *